US006898743B2

(12) United States Patent
Yoon et al.

(10) Patent No.: US 6,898,743 B2
(45) Date of Patent: May 24, 2005

(54) DATA RATE MATCHING METHOD IN 3GPP2 SYSTEM

(75) Inventors: Young Woo Yoon, Seoul (KR); Young Jo Lee, Kyonggi-do (KR); Ki Jun Kim, Seoul (KR); Soon Yil Kwon, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 306 days.

(21) Appl. No.: 09/895,406

(22) Filed: Jul. 2, 2001

(65) Prior Publication Data

US 2002/0015420 A1 Feb. 7, 2002

(30) Foreign Application Priority Data

Jul. 3, 2000 (KR) ......................................... 2000-37729
Jul. 21, 2000 (KR) ......................................... 2000-41820
Sep. 27, 2000 (KR) ......................................... 2000-56583

(51) Int. Cl.[7] ......................... H03M 7/00; H03M 13/27
(52) U.S. Cl. ......................................... 714/701; 341/61
(58) Field of Search .............................. 714/701; 341/61

(56) References Cited

U.S. PATENT DOCUMENTS

| 5,659,569 | A | * | 8/1997 | Padovani et al. | ........... 370/479 |
| 6,111,912 | A | * | 8/2000 | Cohen et al. | ............... 375/225 |
| 6,501,748 | B1 | * | 12/2002 | Belaiche | ...................... 370/342 |
| 6,580,762 | B1 | * | 6/2003 | Tsumura | ...................... 375/295 |
| 6,622,281 | B1 | * | 9/2003 | Yun et al. | .................... 714/790 |
| 6,751,772 | B1 | * | 6/2004 | Kim et al. | .................... 714/786 |

OTHER PUBLICATIONS

Samsung Electronics, "Puncturing for Flexible Data Rate," Seattle, Washington, Apr. 26, 2000, 3GPP2–C30–20000426.
Qualcomm Incorporated, "Puncturing for Flexible Data Rates," Vancouver, British Columbia, Jun. 6, 2000, C30–20000606–006.

* cited by examiner

Primary Examiner—Stephen M. Baker
(74) Attorney, Agent, or Firm—Fleshner & Kim, LLP

(57) ABSTRACT

A flexible data rate matching method in a 3GPP2 system is disclosed that supports flexible data rate repetition on a physical layer of synchronous cdma2000 in an interleaving process. The process includes repeating bits of a channel encoded bitstream with one of a plurality of repetition factors, for matching a length of a repeated bitstream to an interleaving depth, or alternatively, fixing an index of an offset bit, where bit repetition of the channel encoded bitstream is started therefrom, for making the repetition pattern of the channel encoded bitstream to be a desired bit repetition pattern, fixing a repetition factor according to an initial parameter defined by the index of a fixed offset bit, repeating a bit of relevant index, and updating the initial parameter according to the fixed repetition factor, and repeating a process of fixing the repetition factor of a next bit according to the updated initial parameter, repeating the next bit, and re-updating the updated initial parameter, for matching a length of the repeated bitstream to the interleaving depth.

78 Claims, 2 Drawing Sheets

DATA RATE MATCHING METHOD IN 3GPP2 SYSTEM

BACKGROUND OF THE INVENTION

1. Field of the Invention

The present invention relates to a communication system, and more particularly, to a data rate matching method in a 3GPP2 system.

2. Background of the Related Art

In general, the 3GPP2 (the 3rd Generation Partnership Project 2) system has two transmission modes in addition to a regular data rate mode. These modes are a flexible data rate mode and a variable data rate mode.

The regular data rate mode is a transmission mode operative on a fixed chain called a Radio Configuration (RC). The RC represents a kind of transmission chain in which lengths of information data, channel interleaver, and an output bitstreams from a channel encoder according to a code rate of channel codes, are made the same to form a standard. In this instance, there is a certain standard rule among the length of the channel interleaver, the coding rate of the channel encoder, and the length of a channel Walsh code.

That is, once a chip rate to be used is fixed, a number of chips required for one modulated symbol is fixed according to the length of the channel interleaver, which may be defined as a spreading factor, according to which the length of the Walsh code, that can subject different channels to code multiplexing, is fixed. The number of available Walsh codes is proportional to the length of the Walsh code. Therefore, the number of channels that a multiplexing channel can accommodate varies with the Walsh code.

For example, suppose lengths of input information bit sequence have the same lengths after being subjected to a channel coding process. In this instance, the capability of error correction code for correcting possible errors in the channel becomes stronger as the coding rate of the channel encoder becomes lower. That is, the lower the coding rate of the channel encoder, the higher the error correction capability. This permits a lower transmission power to be used.

However, using a low channel coding rate lengthens the output bitstream of the channel encoder, which, in turn, elongates the length of the channel interleaver. As a result, a modulation symbol rate is increased, thus reducing a number of chips required for one modulation symbol at a fixed chip rate, and reducing the number of Walsh codes.

Alternatively, if a high channel coding rate is applied to input bit sequences of the channel encoder of identical lengths, lengths of output bit sequences of the channel encoder become short, even though the error correction capability is low. This decreases the modulation symbol rate, thus permitting the use of a short channel interleaver, to increase a number of available Walsh codes.

From the above description, it is understood that there is a certain trade off between the coding rate of the channel encoder and the Walsh code spacing.

The RC is a standardized transmission chain useful when securing the Walsh code spacing is desirable, or when a lower transmission power is required, taking such a trade off relation into account. In the 3GPP2 system, there are currently several standard RCs for 1X system of 1.2288 Mcps chip rates, and several standard RCs for 3X system of 3.686 Mcps chip rates. It should be noted that, since the spreading factor has a value in a form raised to the second power, both the input data rate and the length of the interleaver defined in each of the RCs also have forms raised by a factor of two.

Before a channel is formed between a mobile station and a base station, the mobile station and the base station determine the RC to be used and the spreading factor on the RC, i.e., the length of the channel interleaver, through negotiation for processing a communication matched to the chain. Modes in which the transmission chain differs from the transmission chain defined in the RC are (i) the flexible data rate mode and (ii) the variable data rate mode.

In the flexible data rate, any data transmission rate other than the standard data transmission rate supported on the RC can be supported. For example, in cdma2000, transmission channels with various symbol rates are adjusted into transmission channels with optimal symbol rates by applying symbol repetition or puncturing thereto. In the adjustment of the symbol rate, a flexible data rate method is generally used, which is a method for supporting any transmission rate other than a standard transmission rate supported in RCs of the cdma2000.

The flexible data rate was introduced to support an Adaptive Multi-Rate (AMR) CODEC, one of speech CODEC in the 3GPP2 on a physical layer. Data bits not consistent to the standard RC transmission rates in present cdma2000 support in a 20 ms frame length may be provided in a case of the AMR. In this instance, as one example, the length of the data bits inconsistent with the standard transmission rate may be matched with a length of data at a transmission rate supported in the RC by using a zero padding on a physical layer. Alternatively, the length of the data bits inconsistent with the standard transmission rate may be matched with a length of data at a transmission rate supported in the RC by means of symbol repetition and puncturing between a channel encoder and a block interleaver for optimizing the data rate (flexible data matching).

On the other hand, the variable data rate mode has been provided under the following purpose. In the 3GPP2 system, the base station makes transmission scheduling to a forward supplemental channel, when the base station assigns a fixed data transmission rate to the mobile station for a time period by means of a message. However, a channel situation between the base station and the mobile station during the particular time period may be changed, and a system load on the base station may be changed. For example, as the mobile station goes farther from the base station, the channel quality becomes poorer, until the base station lacks enough transmission power to transmit data to a particular mobile station at the current data transmission rate.

To solve this problem, the base station may stop transmission of data to supplementary channels for the time period. However, such a solution causes delays in data transmission, as well as needless waste of available transmission power and Walsh codes.

As an alternative, the base station may re-schedule the data transmission rate after a time period is passed. However, this alternative also causes the problem of time delay and waste of the Walsh codes.

The occurrence of this situation is not limited to the forward link. Thus, the channel situation between the mobile station and the base station may also vary with movements of the mobile station in the reverse link. This can cause a lack of transmission power required to sustain an appropriate quality. Consequently, the variable data rate mode is used to solve such a situation.

In the variable data rate mode, the transmission rate is varied with frames depending on situation. That is, if the channel environment is determined to be poor, the base station drops the transmission rate of the supplementary channel. When the channel environment is determined to be restored, the base station restores the transmission rate of the supplementary channel. Provided that such a variable data rate mode is applied, the base station can use available power without frequent re-scheduling.

A related art flexible data rate matching method will be explained with reference to FIG. 1.

A bitstream with a length 'I' is provided to a channel encoder, and encoded into a bitstream with a length L (=nI) (step 10). In this instance, a number 'M' of repetition is fixed according to the following equation, where 'N' denotes an interleaving depth of a block interleaver used in the present RC. The channel-encoded bitstream is symbol repeated in 'M' times (step 11).

$$M = \left\lceil \frac{N}{L} \right\rceil, \quad (1)$$

Here, $\lceil x \rceil$ denotes the smallest integer equal to, or greater than 'x'. The length of the output bitstream after the bitstream passes through a symbol repeater is L*M. If the length of the output bitstream of the symbol repeater has a value greater than a depth 'N' of the block interleaver, the length of the output bitstream is punctured for matching with a desired depth of the interleaver (step 12). Accordingly, an amount 'P' of puncturing required for one frame can be expressed as the following equation (2).

$$P = LM - N \quad (2)$$

For carrying out such a puncturing, at first, a puncturing distance 'D' is defined as follows.

$$D = \left\lfloor \frac{LM}{P} \right\rfloor \quad (3)$$

Here, $\lfloor x \rfloor$ denotes the greatest integer not greater than 'x'. That is, 'P' bits of L*M bits of a bitstream passed through the symbol repeater are punctured at 'D' intervals at indices 'D', '2D', '3D', - - - when the (L*M) bits of the bitstream are indexed from '1' to (L*M). Consequently, the size (length) of the punctured bitstream is the same with the size (depth) 'N' of the interleaver (step 13). Thus, the matching of the flexible data rate is done over two steps of symbol repetition and puncturing in the related art.

Thus, as described before, the length of the channel interleaver used in each RC is fixed according to the spreading factor. Since the spreading factor has a value in a form raised by a power of 2, a ratio of the length of the interleaver fixed according to one spreading factor to the length of the interleaver fixed according to another spreading factor one step lower than the one spreading factor is exactly 1:2.

If the greater spreading factor is represented with 'A' and the smaller spreading factor is represented with 'B', a 1:1 mapping can be established between the spreading factor and the input information bitstream of the channel encoder in each RC. If lengths of the input information bit sequence of the channel encoder are represented with $I_A$ for the spreading factor 'A' and $I_B$ for the spreading factor 'B' respectively, a relation of $I_B = 2*I_A$ is established. If the lengths of the channel interleavers to be used are represented with $N_A$ and $N_B$ respectively, a relation of $N_B = 2*N_A$ is established.

If it is assumed that a coding rate of the channel encoder (using turbo codes or convolution codes) in the present RC is 1/n as illustrated in FIG. 1, taking the flexible or variable data rate mode into account, in which an 'I' (a length of an information bitstream having CRC bits, tail bits, and reserved bits added thereto in steps 10 and 11) is a length of the input bitstream of the channel encoder, that meets a non-regular data length of "$I_A < I < I_B$", the input 'I' will provides an output "n*I", when "$N_A < n*I < N_B$" is also met (step 12).

Consequently, a certain operation for matching the length of the output bitstream of the channel encoder "n*I" to the length of the interleaver is required. A method currently used in 3GPP employs is that the length L (=n*I) of the output bitstream of the channel encoder is matched to the interleaver of $N = N_B$ to require a bit repetition of "$N_B - n*I$" (step 13), according to the following uniform repetition process. That is, a (k)th output symbol of a repetitive block can be predicted starting from a code symbol of $$\left( \left\lfloor \frac{kL}{N} \right\rfloor \right)$$

th input bitstream for an index k increased from '0' up to 'N-1'.

Next, a method for supporting the variable data rate mode will be described. In the variable data rate mode, a highest data rate supportable in the initial negotiation process, a data rate one step lower than the highest data rate, and data rate two steps lower than the highest data rate are defined as a transmission data rate set. Accordingly, in the variable data rate mode for the present supplementary channel, the data transmission rate can be adjusted between the supportable highest transmission rate and the two step lower transmission rate.

In the forward channel, the mobile station can only determine a rate variation by blind rate detection. Therefore, if a range of a data transmission rate variation is taken too large, an operative complexity of the mobile station is increased. The lengths of the channel interleaver and the Walsh codes, used in the highest transmission rate, should not be changed. That is, the interleaver and the Walsh codes used in the highest transmission rate presently should not be changed. If the data transmission rate is dropped to half of the highest transmission rate, two times of symbol repetition is required for matching the length of the interleaver to be used on the channel and the length of the output bitstream of the channel encoder.

Similarly, if the data transmission rate is dropped to a quarter of the highest transmission rate, four times of symbol repetition is required for matching the length of the interleaver to be used on the channel and the length of the output bitstream of the channel encoder. The foregoing example is applicable to a case of forward supplementary channel of a non-flexible data rate.

The variable data rate mode for the flexible data rate can be supported in the supplementary channel. However, in this case, the definitions of the flexible data rate and the variable data rate mode themselves become vague. That is, even if the highest data rate in the variable data rate mode is a regular rate in the present RC and the one step lower data rate is also a data rate fixed in the present RC, the one step lower data rate can already be taken as a flexible data rate that uses no transmission chain fixed in the present RC. This is because the length of interleaver in the variable data rate mode, i.e., the spreading factor, is in a state fixed as the spreading factor at the highest transmission rate.

As one example, consider a RC4 of the present forward channel, when the turbo codes or convolution codes of ½ rate is used. It is assumed that the highest transmission rate useable in the variable data rate mode is 76.8 kbps, when the length of the interleaver used in the forward RC4 is fixed at 3072. A variable data rate method in this mode will be discussed.

It is assumed that an appropriate value from a set of usable data transmission rates {19.2 kbps, 38.4 kbps, and 76.8 kbps} is used. Though data transmission rates of 19.2 kbps, and 38.4 kbps are the transmission rates defined in the RC4, there is no chain that connects the transmission rates to the 3072, the present interleaver length, in the RC. Therefore, those transmission rates may be taken as the variable data rates.

If the chain has an interleaver length fixed at 'N' even in the variable data rate mode and the present data transmission rate not defined in the present RC, the length of output bitstream of the channel encoder and the fixed interleaver length can be matched by means of the aforementioned uniform repetitive algorithm.

Once a transmission chain for supporting the flexible data rate or the variable data rate is included to an existing regular chain, a basic function block diagram as illustrated in FIG. 1 can be formed. A RC5 on a forward link will be described as an example with reference to FIG. 1.

A reserved bit of '0' or '1' is added to channel bits (S10), and CRC bits are added to channel input bits having a length for detection of an error (S11). After the CRC bits are added to the channel input bits, tail bits or the reserved bits are added to the bit sequence (S12). When a convolution code is used, 8 tail bits are added, and when a turbo code is used, 6 tail bits and 2 reserved bits are added. The CRC and reserved bits, and the tail bits are added to form one information bit sequence, which is then channel coded into turbo codes or convolution codes (S13), subjected to symbol repetition (S14) and symbol puncturing (S15) to match with a desired interleaver length, and block interleaved at the block interleaver (S16).

As shown in FIG. 1, a symbol repetition is performed on an existing chain after channel coded in turbo codes or convolution codes, and then the symbol puncturing is performed. Therefore, both the symbol repetition and the symbol puncturing are operative on an existing regular data rate chain. However, as explained before, since an actual rate adaptation is made through a uniform repetition process in a symbol repetition block in the flexible and variable data rate operations, the symbol puncturing block is inoperative.

The method of symbol repetition in the related art has various problems. For example, it requires buffering for the length of output bitstream of the symbol repeater. Moreover, because, in the puncturing, the original bitstream is subjected to an 'M' times of symbol repetition to form an input bitstream greater than an interleaver block depth 'N' and the puncturing is made on the input bitstream, a method of symbol repetition changed from the related art is required for avoiding excessive repetition of an unnecessary bitstream to form an appropriate input bitstream for the puncturing block depth.

Additionally, Table 1 shows problems of a variable data rate operation mode in the forward link RC 5, and in the backward link RC4. In the table 1, it is assumed that a virtual set of the variable data rate has {115.2 kbps, 80 kbps, 57.6 kbps}. Then, a size of a desired channel interleaver for a maximum allocated data rate is 6144. A chain for 115.2 kbps, the maximum allocated data rate, may be assumed to be an existing regular data rate chain, and, according to this, as can be known from FIG. 1, 4 symbols out of 12 code symbols are punctured for rate adaptation.

TABLE 1

| Information data rate | Length of a coder output sequence | Rate matching | Length of desired interleaver |
|---|---|---|---|
| 115.2 kbps | 2304 * 4 = 9215 | 4 bit puncturing among 12 bits (regular chain puncturing) | 6144 |
| 80 kbps | 1600 * 4 = 6400 | Inoperative | 6144 |
| 57.6 kbps | 1152 * 4 = 4608 | 1536 symbol repetition | 6144 |

The symbol puncturing pattern for puncturing 4 symbols out of 12 symbols is defined in 3GPP2 for turbo codes and convolution codes as a sort of fixed pattern. Next, a chain for 57.6 kbps may be assumed to be a sort of flexible chain, when a 1536 bit uniform symbol repetitive algorithm is required for matching a length of a 4608 bit output sequence of the channel coder to a size of a 6144 bit interleaver. Then, operation of the puncturing block in FIG. 1 is stopped. However, the problem in the table 1 is a length of 6400 bits of the output sequence form the channel coder in 80 kbps is already greater than a desired length 6144 of the channel interleaver. Therefore, it is impossible to complete an existing regular chain by using an existing symbol repetition block.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a flexible data rate matching method in a 3GPP2 system that substantially obviates one or more of the problems due to limitations and disadvantages of the related art.

Another object of the present invention is to provide a flexible data rate matching method in a 3GPP2 system, which can carry out symbol repetition and puncturing in one step.

Another object of the present invention is to provide a flexible data rate matching method in a 3GPP2 system, in which symbol repetition and puncturing can be made by one uniform symbol repetition.

Another object of the present invention is to provide a data rate matching method in a 3GPP2 communication system that supports a flexible data rate and a variable data rate on an existing transmission chain.

To achieve at least these advantages in whole or in parts, there is provided a flexible data rate matching method in a 3GPP2 for mapping an input bitstream of one data rate on a physical layer, including the steps of (1) subjecting the input bitstream to channel encoding, and (2) repeating bits of the channel encoded bitstream with one of a plurality of repetition factors, for matching a length of a repeated bitstream to an interleaving depth.

The repetition factor is either one of a greatest integer $M_1$ not greater than a value obtainable by dividing the interleaving depth by the length of the channel encoded bitstream and an $M_2$ greater than the $M_1$ by one.

To further achieve at least the above objects in whole or in parts, there is provided a flexible data rate matching method in a 3GPP2 system for mapping an input bitstream of one data rate on a physical layer, including the steps of (1)

subjecting the input bitstream to channel encoding, (2) fixing an index of an offset bit repetition of the channel encoded bitstream is started therefrom, for making the repetition pattern of the channel encoded bitstream to be a desired bit repetition pattern, (3) fixing a repetition factor according to an initial parameter defined by the index of a fixed offset bit, repeating a bit of relevant index, and updating the initial parameter according to the fixed repetition factor, and (4) repeating a process of fixing the repetition factor of a next bit according to the updated initial parameter, repeating the next bit, and re-updating the updated initial parameter, for matching a length of the repeated bitstream to the interleaving depth.

To further achieve the above objects in whole or in parts, there is provided a flexible data rate matching method in a 3GPP2 system for mapping an input bitstream of one data rate on a physical layer, comprising (1) performing to channel encoding on an input bitstream; and (2) repeating bits of the channel encoded bitstream in accordance with first and second repetition factors, the first repetition factor being different than the second repetition factor.

To further achieve the above objects in whole or in parts, there is provided a flexible data rate matching method in a 3GPP2 communication system in an interleaving process for mapping an input bitstream of one data rate on a physical layer, comprising (1) performing channel encoding on an input bitstream; (2) setting an index of an offset bit from which bit repetition of the channel encoded bitstream is started to make a repetition pattern of the channel encoded bitstream to be a desired bit repetition pattern; (3) setting a repetition factor according to an initial parameter defined by the index of a fixed offset bit, repeating a bit of relevant index, and updating an initial parameter according to the fixed repetition factor; and (4) repeating a process of fixing the repetition factor of a next bit according to the updated initial parameter, repeating the next bit, and re-updating the updated initial parameter, to match a length of the repeated bitstream to the interleaving depth.

To further achieve the above objects in whole or in parts, there is provided a flexible data rate matching method in a 3GPP2 system for mapping an input bitstream of one data rate on a physical layer, comprising subjecting the input bitstream to channel encoding; (2) fixing an index of an offset bit from which bit repetition of the channel encoded bitstream is started, to make a repetition pattern of the channel encoded bitstream to be a desired bit repetition pattern; (3) comparing a remainder of an index increased by a prescribed number of bits from the index of the fixed offset bit divided by a length of the channel encoded bitstream to the number of bits, for fixing a repetition factor; and (4) repeating bits according to the fixed repetition factor, to match a length of the repeated bitstream to an interleaving depth.

To further achieve the above objects in whole or in parts, there is provided a method of matching a data rate in a communication system, comprising receiving a coded bitstream from an encoder, the coded bitstream having one of a variable rate and a flexible rate; determining first and second repetition factors, the second repetition factor being a sum of the first repetition factor plus '1'; and repeating a first number of bits of the coded bitstream by the first repetition factor and repeating a second number of bits of the bitstream by the second repetition factor to match the data rate to an interleaver, the sum of the first and second number of bits being a total length of the coded bitstream.

To further achieve the above objects in whole or in parts, there is provided a method of matching a data rate in a communication system, comprising receiving a coded bitstream from an encoder, the coded bitstream having one of a variable rate and a flexible rate; determining first and second puncturing factors, the second puncturing factor being a sum of the first puncturing factor plus '1'; and puncturing a first number of bits of the coded bitstream by the first puncturing factor and puncturing a second number of bits of the bitstream by the second puncturing factor to match the data rate to an interleaver, the sum of the first and second number of bits being a total length of the coded bitstream.

To further achieve the above objects in whole or in parts, there is provided a communication device, comprising means for receiving a coded bitstream from an encoder, the coded bitstream having one of a variable rate and a flexible rate; means for determining first and second repetition factors, the second repetition factor being a sum of the first repetition factor plus '1'; and means for repeating a first number of bits of the coded bitstream by the first repetition factor and repeating a second number of bits of the bitstream by the second repetition factor to match the data rate to an interleaver, the sum of the first and second number of bits being a total length of the coded bitstream.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
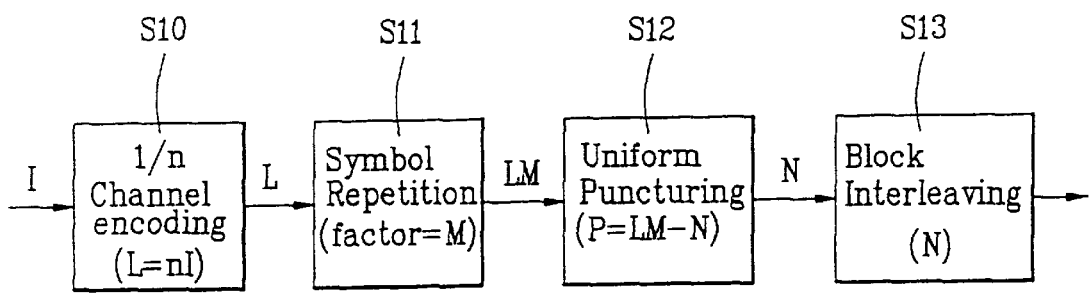
FIG. 1 illustrates a related art flexible data rate matching method.
Figure 2:
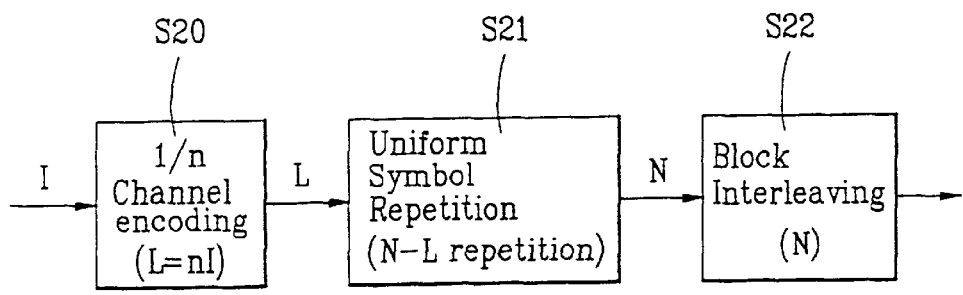
FIG. 2 illustrates a flexible data rate matching method in accordance with a preferred embodiment of the present invention.

Reference will now be made in detail to the preferred embodiments of the present invention, examples of which are illustrated in the accompanying drawings. FIG. 2 illustrates a flexible data rate matching method in accordance with a preferred embodiment of the present invention.

Referring to FIG. 2, an input bitstream with a length 'I' is channel encoded into an output bitstream with a length L (=nI) (step 20). (N–L) bits of the channel encoded output bitstream are repeated so that a length of a new bitstream inclusive of the repeated bits is matched with an interleaving depth. In the meantime, for optimizing decoding at a reception terminal, intervals of the bits repeated with a repetition factor in the channel encoded output bitstream are required to be uniform over 'L' thereof (step 21).

The repetition factor is selected from a plurality of repetition factors, the calculation of which will be explained later. It should be taken into consideration that (N–L) may be greater than 'L', and the depth 'N' of the interleaver may be greater than two times of the length of the channel encoded bitstream. As the (N−L) bits are repeated on the entire bitstream of the channel encoder uniformly with the repetition factor, the rate matching process can be carried out without the puncturing in the related art (step 22). That is, the present invention suggests making one step of a uniform symbol repetition instead of the two steps of symbol repetition and puncturing in the rate matching, for realizing an optimal data rate matching. Therefore, the present invention defines two repetition factors $M_1$ and $M_2$ as the following equations (4) and (5).

$$M_1 = \left\lfloor \frac{N}{L} \right\rfloor \quad (4)$$

$$M_2 = M_1 + 1 \quad (5)$$

The number of bits to be repeated for $M_2$ times in the bitstream of 'L' bits is defined as $K_1$, which can be calculated by modular operation of 'N' and 'L' as the following equation (6).

$$K_1 = N \bmod L \quad (6)$$

Similar to $K_1$, the number of bits to be repeated for $M_2$ times in the bitstream of 'L' bits is defined as $K_2$, which can be calculated as the following equation (7).

$$K_2 = L - K \quad (7)$$

The length 'N' of the symbol repeated bitstream can be expressed as follows.

$$N = M_2 K_1 + M_1 K_2 \quad (8)$$

For uniform interval bit repetition according to $M_1$ and $M_2$ over the entire channel encoded bitstream, $K_1$ bits to be repeated for $M_2$ times are selected uniformly from the channel encoded bitstream of 'L' bits, for which the following first algorithm is provided. Indices (i) of the bits in the channel encoded bitstream are increased from '0' to 'L−1' in the following description.

First Algorithm
for (i=0; i<L; i++){
  if (((i>$K_1$)+a)mod L<$K_1$); in order to fix the repetition factor of the bits, the bit index is increased from an offset bit index 'a' by a $K_1$ increment
    repeat ith bit with repetition factor $M_2$
    else repeat ith bit with repetition factor $M_1$
}

That is, in the first algorithm, when the bit index of the channel encoded bitstream increases in increments of '1' from '0' to 'L−1'. Then, each of (mod L) values of the values increased by $K_1$ increment from the offset bit index is compared to $K_1$, to repeat a relevant bit for the repetition factor of $M_2$ times if the (mod L) value is smaller than $K_1$, and to repeat a relevant bit for the repetition factor of $M_1$ times if the (mod L) value is equal to, or greater than $K_1$. The "a" acts as a sort of offset for designating the index of the bit to be repeated, initially. Therefore, "a" may be a constant equal to, or greater than '0', depending on which value an eventual repetition pattern of the channel encoded bitstream has a pattern of a end-around shifted form.

For an example, it is assumed that the length 'L' of the channel encoded bitstream is '10' and the depth 'N' of a desired interleaver is 25. In this instance, for making a rate matching in the related art, at first 'M' is calculated to be three according to $$\left\lceil \frac{25}{10} \right\rceil.$$

Then, the symbol repetition is made according to the repetition factor three, to obtain an output bitstream with a length L·M to be 30. To match the interleaver depth of 25, five of the bits are punctured. Accordingly, it may be taken that, in the existing RC, the bits not punctured are bits of original channel encoded bitstream repeated according to the repetition factor 3, and the punctured five bits are bits of original channel encoded bitstream repeated according to the repetition factor of two.

In the present invention, however, the rate matching is carried out according to the following one step. That is, the numbers of symbol repetition (or the repetition factors) $M_1$ and $M_2$ are calculated as follows. That is, $M_1$ is calculated to be two according to $$\left\lfloor \frac{25}{10} \right\rfloor (= 2),$$

and $M_2$ is calculated to be three according to "$M_1+1$" (=3). Next, the number $K_1$ of bits to be repeated for $M_2$ times in the 'L' (10) bits of the channel encoded bitstream is calculated to be five according to "25 mod 10". In conclusion, the question of symbol repetition lies on uniform selection of bits of the repetition factor two and the five bits of the repetition factor 3 from the entire bitstream of 10 bits.

Figure 3A:
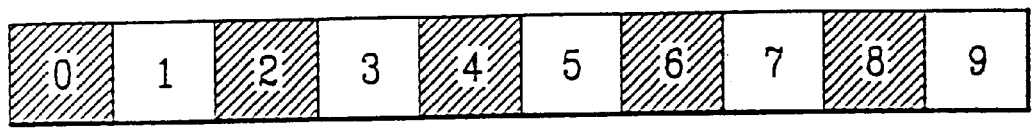
FIGS. 3A and 3B illustrate one example of the flexible data rate matching method in accordance with a preferred embodiment of the present invention.
Figure 3B:
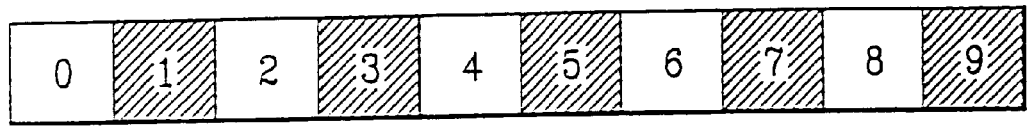

In a case the first algorithm of the present invention is used, positions of the repeated bits of the repetition factor $M_1$ and $M_2$ in the channel encoded bitstream provide repetition patterns as illustrated in FIGS. 3A and 3B. FIG. 3A illustrates a repetition factor when the constant a=0, and FIG. 3B illustrates a repetition factor when the constant a=9 (=L−1).

Referring to FIGS. 3A and 3B, the hatched parts represent positions of bits of the channel encoded bitstream repeated in the repetition factor 3 (=$M_2$) as calculated in the foregoing example of the present invention, and the non-hatched parts represent positions of bits repeated in the repetition factor 2 ($M_1$) of the present invention. From FIGS. 3A and 3B, it is noted that the algorithm of the present invention can make a desired symbol repetition by changing the constant 'a'. In this instance, as the constant 'a' changes, the pattern of repetition of the bits in the channel encoded bits returns to an original pattern. The symbol repetition according to the algorithm of the present invention can provide an identical or desired repetition pattern according to the following four embodiments. That is, in the four embodiments, a parameter 'ACC' is defined by using the constant 'a' of the first algorithm, the repetition factor of a bit of an index has a value $M_1$ or $M_2$ according to an updated value of the parameter 'ACC', and the symbol repetition according to the different repetition factors is made for the entire channel encoded bitstream, uniformly. Variables defined in the equations (4)–(7) are used without change in the following four embodiments.

First Embodiment
  i=0
  ACC={(L−$K_1$+a) mod L}+$K_1$; initialize the ACC parameter
  do while (i<L){
    if (ACC≧L); compare ACC to the length 'L' of the channel encoded bitstream
      Repeat ith bit with the repetition factor $M_2$ ACC=ACC−L+K$_1$; update ACC by using K$_2$(=L−K$_1$) decrement of the ACC
   else
     Repeat ith bit with the repetition factor M$_1$
     ACC=ACC+K$_1$; update ACC by using K$_1$ increment of the ACC
   }

In the first embodiment, the parameter 'ACC' is defined to be '{(L−K$_1$+a) mod L}+K$_1$', for carrying out the bit repetition according to the repetition factor M$_2$ if ACC is equal to, or greater than the length of the channel encoded bitstream, and carrying out the bit repetition according to the repetition factor M$_1$ if ACC is smaller than the length of the channel encoded bitstream. After the bit repetition is done according to one of the two repetition factors, the parameter 'ACC' is updated to a value decreased by K$_2$ for the repetition factor M$_2$ and increased by K$_1$ for the repetition factor M$_1$, for being used as a parameter for fixing the repetition factor of the next bit. The algorithm is operative during the bit index 'i' is increased from '0' to 'L−1' for fixing the repetition factor of the bits in the channel encoded bitstream.

Second Embodiment
   i=0
   ACC=(L−K$_1$+a) mod L; initialize the ACC parameter
   do while (i<L){
     ACC=ACC+K$_1$; increase ACC by K$_1$; before carrying out a test for fixing the repetition factor of a bit with a relevant index
     if (ACC≧L); compare ACC to the length 'L' of the channel encoded bitstream
     Repeat ith bit with the repetition factor M$_2$
     ACC=ACC−L; decreasing ACC by the length 'L' of the channel encoded bitstream
   else
     Repeat ith bit with the repetition factor M$_1$
   }

In the second embodiment, the parameter 'ACC' is defined to be '{(L−K$_1$+a) mod L}', for carrying out the bit repetition according to the repetition factor M$_2$ if ACC is equal to, or greater than the length of the channel encoded bitstream, and carrying out the bit repetition according to the repetition factor M$_1$ if ACC is smaller than the length of the channel encoded bitstream. After the bit repetition is done, the parameter 'ACC' is updated to a value decreased by the length 'L' of the channel encoded bitstream for the repetition factor M$_2$, for being used as a parameter for fixing the repetition factor for the next bit. The algorithm is operative during the bit index 'i' is increased from '0' to 'L−1' for fixing the repetition factor of the bits in the channel encoded bitstream.

Third Embodiment
   i=0
   ACC=(L−(a mod L)+K$_1$−1) mod L; initialize the ACC parameter
   do while (i<L){
     if (ACC<K$_1$); compare ACC to the number K$_1$ of bits repeated for M$_2$ times in the entire channel encoded bitstream
     Repeat ith bit with the repetition factor M$_2$
     ACC=ACC+K$_2$; update ACC by using K$_2$ (=L−K$_1$) increment of the ACC
   else
     Repeat ith bit with the repetition factor M$_1$
     ACC=ACC−K$_1$; update ACC by using K$_1$ decrement of the ACC
   }

In the third embodiment, the parameter 'ACC' is defined to be '(L−(a mod L)K$_1$−1) mod L, for carrying out the bit repetition according to the repetition factor M$_2$ if ACC is smaller than K$_1$, and carrying out the bit repetition according to the repetition factor M$_1$ if ACC is equal to, or greater than K$_1$. After the bit repetition is done according to one of the two repetition factors, the parameter 'ACC' is updated to a value increased by K$_2$ for the repetition factor M$_2$ and decreased by K$_1$ for the repetition factor M$_1$, for being used as a parameter for fixing the repetition factor of the next bit. The algorithm is operative during the bit index 'i' is increased from '0' to 'L−1' for fixing the repetition factor of the bits in the channel encoded bitstream.

Fourth Embodiment
   IN_SYM=0; store index in an input buffer
   ACC=b=(K$_1$+L−1−a) mod L; initialize ACC
   while (IN_SYM<L)
     while (ACC<N)
       output symbol IN_SYM; forward the stored input bit index as an output bit index in a case IN_SYM is smaller than 'L' and ACC is smaller than 'N'
       ACC=ACC+L; increase ACC by 'L'
     end while;
     IN_SYM=IN_SYM+1; increase IN-SYM by unity
     ACC=ACC−N; decrease ACC by N
   end while;

In the fourth embodiment, when the bits of the bitstream provided to the symbol repetition block have indices from '0' to 'L−1' and N bits of a bitstream from the symbol repetition block have indices from '0' to 'N−1', a value of a (k)th bit (0<k<N) of the bitstream form the symbol repetition block can be predicted from a value of a $$\left(\left\lfloor \frac{(k \times L) + b}{N} \right\rfloor\right)$$

th bit of the bitstream provided to the symbol repetition block. That is, the kth output symbol will be the ⌊kL/N⌋th input symbol. When b is set to '0'. Particularly, by adjusting the constant 'b' which can be increased from '0' to 'L−1', a repetition pattern exactly identical to the repetition pattern of the first algorithm explained before can be provided in the fourth embodiment. In this instance, the relational expression of the 'a' in the first algorithm and the 'b' can be converted as follows.

$b=(K_1+L−1−a) \bmod L$ $a=(K_1+L−1−b) \bmod L$

By exchanging the initial offsets 'a' and 'b' in the fourth embodiment, repetition patterns exactly identical to each other are obtainable.

Another embodiment of the present invention is directed to a symbol repetition or symbol puncturing method which can support both a flexible data rate and a variable data rate on one chain when the symbol repetition and the symbol puncturing are carried out on one transmission chain. In this instance, the symbol repetition or the symbol puncturing is carried out on the transmission chain exclusively from each other.

Fifth Embodiment

The fifth embodiment is a symbol repetition algorithm for supporting a flexible data rate and a variable data rate. According to this embodiment, the symbol repetition is made when a length of a channel coded information bit sequence is shorter than a desired length of an interleaver. The symbol repetition pattern is defined as follows.

When a length of an output sequence of a channel coder is 'L', and a desired length of a channel interleaver is 'N', a symbol repetition factor is defined as 'N/L'. If a calculated symbol repetition factor is smaller than '1', operation of a symbol repetition block is stopped. However, if the calculated symbol repetition factor is greater than '1', the following algorithm is applied in carrying out a uniform symbol repetition.

Uniform Symbol Repetition Algorithm

A (k)th output symbol of a symbol repetition block can be estimated from a '$\lfloor kL/N \rfloor$'th symbol among input symbols (an output sequence of the channel coder) of the symbol repetition block. Here, 'k' denotes a value increasing from '0' to 'N−1', 'L' denotes a number of coded symbols per a frame in an output sequence of a coder, and 'N' denotes a desired length of the channel interleaver equal to, or greater than 'L'. When 'N' is smaller than 'L', a block for carrying out a uniform symbol repetition is not operative, but a block for carrying out puncturing is operative.

Sixth Embodiment

The sixth embodiment is a symbol puncturing algorithm for supporting a flexible data rate and a variable data rate. The symbol puncturing is made according to the following puncturing algorithm when a length of an output sequence of a channel coder is longer than a desired length of a channel interleaver.

Uniform Symbol Puncturing Algorithm

A (k)th output symbol of a puncturing block can be estimated from a '$\lfloor kL/N \rfloor$'th symbol among input symbols (an output sequence of the channel coder) of the puncturing block. Here, 'k' denotes a value increasing from '0' to 'N−1', 'L' denotes a number of coded symbols per a frame in an output sequence of a coder, and 'N' denotes a desired length of the channel interleaver smaller than 'L'. When 'N' is equal to, or greater than 'L', a puncturing block for puncturing is not operative. It is noted that operation of the puncturing block and the symbol repetition block are exclusive to each other. That is, if the symbol repetition block is operative, the symbol puncturing block is always not operative, and vice-versa.

In the sixth embodiment, optimum puncturing of a turbo coded output sequence is required to be taken into account, and the puncturing block is operative at an optimal condition with respect to a convolution code. However, with respect to the turbo code, since operation of the puncturing block can not satisfy a condition for puncturing a turbo coded output sequence, there may be a slight loss.

Therefore, in the sixth embodiment, a separate puncturing algorithm, particularly for the turbo code, may be defined. That is, an algorithm that excludes puncturing of turbo coded systematic bits may be defined.

When a transmission chain is formed from the foregoing puncturing algorithm, there is an additional advantage. Specifically, a maximum information data rate of the flexible data rate defined in a RC can be increased. The RCs of which maximum information data rates are increased through this are the backward link RC4, and RC6, and the forward link RC5, and RC9, which may be summarized as shown in Table 2, below.

TABLE 2

| RC | Related art transmission chain | | Transmission chain of the present invention | |
|---|---|---|---|---|
| | Number of bits (information + CRC + tail) | Information data rate (bps) | Number of bits (information + CRC + tail) | Information data rate (bps) |
| Backward RC | 3072 | 153600 | 4607 | 230350 |
| Backward RC | 18432 | 921600 | 20735 | 1036750 |
| Forward RC | 3072 | 153600 | 4607 | 230350 |
| Forward RC | 18432 | 921600 | 20735 | 1036750 |

That is, as shown in Table 2, when an information bit sequence of a flexible data rate is subjected to symbol repetition, or symbol puncturing, the present invention increases the maximum information transmission rate of the information bit sequence.

It should be understood that all of the above described embodiments of rate matching could be applied to perform rate matching using puncturing instead of repetition. Thus, instead of calculating a bit to be repeated by the appropriate number of times, the process would calculate a bit to be punctured. The equations and algorithms would otherwise remain the same.

The flexible data rate matching method in a 3GPP2 system of the present invention has many advantages. For example, the two steps of rate matching required in the related art inclusive of a certain times of symbol repetition and puncturing can be reduced to one step of uniform repetition.

Additionally, a uniform repetition pattern is obtainable by using a process simpler than the flexible data rate matching in the related art.

Furthermore, the operation of the variable data rate and the flexible data rate can be made positively in all RCs of 3GPP2 standard by making a uniform puncturing algorithm in an existing chain. The use of the uniform puncturing algorithm increases a maximum information data rate for the flexible data rate in some of RCs.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A data rate matching method in a communication system for mapping input bits to a data rate on a physical layer, comprising:

(1) channel coding input bits; and (2) repeating bits of the channel coded bits in accordance with first and second repetition factors, the first repetition factor being different than the second repetition factor, for matching resultant bits to an interleaver size.

2. The method of claim 1, wherein a repetition factor is one of a first and a second value, the first value $M_1$ being a greatest integer not greater than a value obtainable by dividing the interleaver size by the length L of the coded bits, and the second value $M_2$ being the sum of $M_1$ plus '1'.

3. The method of claim 2, wherein the number of bits of the coded bits repeated according to $M_2$ is a remainder obtainable by dividing the interleaver size by the length of the coded bits.

4. The method of claim 2, wherein the number of bits of the coded bits repeated according to $M_1$ is a value obtainable by subtracting the number of bits of the coded bits repeated according to $M_2$ from the length of the coded bits.

5. The method of claim 1, wherein a k-th output bit is a $\lfloor kL/N \rfloor$-th bit of the coded bits, wherein L is a number of coded bits per frame of an encoder output, and wherein N is the interleaving size.

6. The method of claim 5, wherein k is a number between 0 and N−1.

7. A data rate matching method in a communication system for mapping input bits to a data rate on a physical layer, comprising:

(1) performing channel coding on the input bits; and (2) repeating a number of coded bits for generating a desired repetition pattern for input to an interleaver having a size N, the step including:

(a) setting an offset value from which bit repetition of the coded bits is to start;

(b) comparing an initial parameter, which is defined based on the offset value, to a predetermined value;

(c) determining a repetition factor based on the comparison step (b);

(d) repeating a coded bit of a corresponding code bit index based on the repetition factor;

(e) updating the initial parameter according to the determined repetition factor; and (f) repeating steps (b)–(e) until code bit index is L−1, wherein L is a length of the coded bits.

8. The method of claim 7, wherein the repetition factor is one of a first and second repetition factor, wherein the first repetition factor is a greatest integer not greater than N divided by L, and wherein the second repetition factor is the first repetition factor plus '1'.

9. The method of claim 8, wherein a number of coded bits repeated in the coded bits according to the second repetition factor is a remainder $K_1$ of N divided by L, and the number of coded bits in the coded bits repeated according to the first repetition factor is $K_2$, which is L subtracted by $K_1$.

10. The method of claim 9, wherein the initial parameter is a remainder of the offset value plus $K_2$ divided by 'L', and when the initial parameter is equal to or greater than L, at least one corresponding bit is repeated based on the second repetition factor, and the initial parameter is decreased by $K_2$.

11. The method of claim 10, wherein when the initial parameter is smaller than L, at least one corresponding bit is repeated based on the first repetition factor, and the initial parameter is increased by $K_1$.

12. The method of claim 9, wherein the initial parameter is a remainder of the offset value plus $K_2$ divided by L, and when the initial parameter increased by $K_1$ is equal to or greater than 'L', at least one corresponding bit is repeated based on the second repetition factor, and the increased initial parameter is decreased by 'L'.

13. The method of claim 12, wherein when the initial parameter increased by $K_1$ is smaller than 'L', at least one corresponding bit is repeated based on the first repetition factor.

14. The method of claim 9, wherein the initial parameter is a remainder of a value divided by 'L', the value being 'L' subtracted by a remainder of the offset value divided by 'L' added with ($K_1$−1), and when the initial parameter is smaller than $K_1$, at least one corresponding bit is repeated based on the second repetition factor, and the initial parameter is increased by '$K_2$'.

15. The method of claim 14, wherein when the initial parameter is equal to or greater than $K_1$, at least one corresponding bit is repeated based on the first repetition factor, and the initial parameter is decreased by '$K_1$'.

16. A data rate matching method, comprising:

encoding input bits of a first prescribed number I by an encoder;

providing a second prescribed number L of output encoded bits, where there is a prescribed relationship between I and L based on encoding; and repeating the output encoded bits to match an interleaver size N, wherein the encoded bits have indices from '0' to 'L−1', the repeated bits have indices k from '0' to 'N−1', and a parameter 'b' is defined using an offset value from which bit repetition is to start, wherein the k-th bit of the repeated bits provide to an interleaver is predicted from $\lfloor (k*L)+b/N \rfloor$-th encoded bit.

17. The method of claim 16, wherein b=($K_1$+L−1−a) mod L, where $K_1$=N mod L, and a=the offset value.

18. The method of claim 17, wherein a=($K_1$+L−1−b) mod L.

19. The method of claim 16, wherein 'b' is increased by 'L' if an index of the encoded bits is smaller than 'L' and 'b'<'N'.

20. The method of claim 16, wherein 'b' is decreased by 'N' if an index of the encoded bits is smaller than 'L' and 'b' is equal to, or greater than 'N'.

21. A rate matching method in a system for mapping input bits to a data rate on a physical layer, comprising:

(1) channel coding the input bits; and (2) repeating a number of coded bits for generating a desired bit repetition pattern for input to an interleaver having a size N, the step including:

(a) setting an offset value from which bit repetition of the coded bits is to start;

(b) comparing a remainder of a coded bit index increased by a prescribed number of bits from the offset value divided by a length of the coded bits, to the prescribed number of bits, for determining a repetition factor; and (c) repeating at least one bit according to the determined repetition factor; and (d) repeating steps (b) and (c) until coded bit index is L−1, wherein L is the length of the coded bits.

22. The method of claim 21, wherein the prescribed number of bits is a remainder of N divided by L, and the coded bit index is increased based on multiplication with the prescribed number.

23. The method of claim 21, wherein the determined repetition factor is one of a first repetition factor and a second repetition factor, wherein the first repetition factor is a greatest integer not greater than N divided by L, and wherein the second repetition factor is the first repetition factor plus '1'.

24. The method of claim 21, wherein a k-th output bit is a $\lfloor kL/N \rfloor$-th bit of the coded bits, wherein L is a number of coded bits per frame at an output of an encoder that encodes the input bits, and wherein N is the interleaver size.

25. A method of matching a data rate of a channel based on a variable rate or a flexible rate of input bits in a communication system, comprising:

receiving coded bits from an encoder;

determining first and second repetition factors, the second repetition factor being a sum of the first repetition factor plus '1'; and repeating a first number of bits of the coded bits by the first repetition factor and repeating a second number of bits of the coded bits by the second repetition factor for matching resultant bits to a size of an interleaver.

26. The method of claim 25, wherein the data rate is matched without carrying out a puncturing operation.

27. The method of claim 25, wherein the first repetition factor is $\lfloor N/L \rfloor$, where L is a length of the coded bits.

28. The method of claim 25, wherein the number of bits to be repeated by the second repetition factor is a difference between a length of the coded bits and the number of bits to be repeated based on the first repetition factor.

29. The method of claim 28, wherein the number of bits to be repeated by the first repetition factor is N mod L, where L is the length of the coded bits.

30. The method of claim 25, wherein a k-th output bit is defined as the $\lfloor kL/N \rfloor$-th coded bit received from the encoder, wherein L is a number of coded bits per frame at an output of the encoder, N is the size of the interleaver, and k is a number between 0 and N−1.

31. A method of matching a data rate of a channel based on a variable rate or a flexible rate of input bits in a communication system, comprising:

receiving coded bits from an encoder,;

determining first and second puncturing factors, the second puncturing factor being a sum of the first puncturing factor plus '1'; and puncturing a first number of bits of the coded bits by the first puncturing factor and puncturing a second number of bits of the coded bits by the second puncturing factor for matching resultant bits to a size of an interleaver.

32. The method of claim 31, wherein the data rate is matched without carrying out a repeating operation.

33. The method of claim 31, wherein the first puncturing factor is a lower bound of the size of the interleaver divided by the length of the coded bits.

34. The method of claim 31, wherein the number of bits to be punctured by the second puncturing factor is a result of the length of the coded bits modulo the size of the interleaver.

35. The method of claim 34, wherein the number of bits to be punctured by the first puncturing factor is a difference of the length of the coded bits and the number of bits to be punctured by the second puncturing factor.

36. The method of claim 31, wherein a k-th bit provided to the interleaver is a $\lfloor kL/N \rfloor$-th coded bit of the coded bits, wherein L is a number of coded bits per frame at an output of the encoder, and wherein N is the size of the interleaver.

37. A communication device, comprising:

means for receiving coded bits from an encoder;

means for determining first and second repetition factors, the second repetition factor being a sum of the first repetition factor plus '1'; and means for repeating a first number of bits of the coded bits by the first repetition factor and repeating a second number of bits of the coded bits by the second repetition factor for matching resultant bits to a size of an interleaver.

38. The method of claim 37, further comprising means for matching the data rate without carrying out a puncturing operation.

39. The method of claim 37, wherein the first repetition factor is a lower bound of the size of the interleaver divided by the length of the coded bits.

40. The method of claim 39, wherein the number of bits to be repeated by the second repetition factor is a difference of the size of the coded bits minus the number of bits to be repeated by the second repetition factor.

41. The method of claim 37, wherein the number of bits to be repeated by the second repetition factor is a modulus of the size of the interleaver and the length of the coded bits.

42. The device of claim 37, wherein a k-th bit provided to the interleaver is a $\lfloor kL/N \rfloor$-th bit of the coded bits received from the encoder, wherein L is a number of symbols per frame at an output of the encoder, and wherein N is a the size of the interleaver.

43. A communication device, comprising:

means for receiving coded bits from an encoder;

means for determining first and second repetition factors, the second repetition factor being a sum of the first repetition factor plus '1'; and means for repeating a first number of bits of the coded bits by the first repetition factor and repeating a second number of bits of the coded bits by the second repetition factor such that a k-th output bit is a $\lfloor kL/N \rfloor$-th bit of the coded bits, where L is a number of coded bits per frame at an output of the encoder and N is a size of an interleaver, so as to match the size of an interleaver.

44. The device of claim 43, wherein a sum of the first and second number of bits is a total length of the coded bits.

45. The device of claim 37 or 43, wherein the data rate is a flexible data rate.

46. The device of claim 45, wherein the data rate includes a variable data rate.

47. A data rate matching method, comprising:

encoding input data of a first prescribed number I by an encoder;

providing a second prescribed number L of encoded data, where there is a prescribed relationship between I and L based on encoding; and matching the second prescribed number L of the encoded data to an interleaver size N, wherein the k-th output data provided to the interleaver is $\lfloor kL/N \rfloor$-th encoded data from the encoder, where k=0 to N−1.

48. The method of claim 47, wherein the rate of the input data is at least one of flexible or variable data rate.

49. The method of claim 47 or 48, wherein N≧L, and the second prescribed number L of encoded data is matched to the interleaver size N based on repetition of a number of encoded data.

50. The method of claim 49, wherein puncturing is disabled.

51. The method of claim 49, wherein the number of repeated encoded data is N−L.

52. The method of claim 47 or 48, wherein N<L, and the second prescribed number L of encoded data is matched to the interleaver size based on puncturing a number of encoded data.

53. The method of claim 52, wherein repetition is disabled.

54. The method of claim 47, wherein the method is used for one of radio configuration (RC) 4, RC5 and RC6 of a physical channel.

55. The method of claim 47, wherein the encoded data comprises code symbols and the second prescribed number L is the number of code symbols per frame.

56. The method of claim 47, 48 or 55, wherein the encoder is one of a turbo encoder and a convolutional encoder.

57. A data rate matching method, comprising:

encoding input data of a first prescribed number I by an encoder;

providing a second prescribed number L of encoded data, where there is a prescribed relationship between I and L based on encoding; and matching the second prescribed number L of the encoded data to an interleaver size N, wherein when N is greater than L, repetition of the encoded data is variable, and when N is smaller than L, puncturing of the encoded data is variable.

58. The data rate matching method of claim 57, wherein variable repetition is achieved by a first corresponding number of encoded data repeated differently relative to a second corresponding number of encoded data.

59. The data rate matching method of claim 57, wherein the repetition of at least one encoded data is different from the rest of the encoded data.

60. The data rate matching method of claim 57, wherein at least one encoded data is not repeat the same as the rest of the encoded data.

61. The data rate matching method of claim 59 or 60, wherein the rest of the encoded data is not repeated.

62. The data rate matching method of claim 57, wherein the number of encoded data repeated is N−L.

63. The data rate matching method of claim 57, wherein repetition of a predetermined number of encoded data is based on N mod L.

64. The data rate matching method of claim 57, wherein k-th data provided to the interleaver is $\lfloor kL/N \rfloor$-th encoded data from the encoder, where k−0 to N−1 for when N>L or when N<L.

65. The data rate matching method of claim 57, wherein the repetition of the N−L number of the encoded data are repeated, and the repetition of a predetermined number of encoded data is based on N mod L.

66. The data rate matching method of claim 57, wherein the encoded data is punctured after the encoding step.

67. The data rate matching method of claim 57, wherein the encoded data is punctured without repetition of the encoded data.

68. The data rate matching method of claim 57, wherein the encoded data comprises code symbols and the second prescribed number L is the number of code symbols per frame and the encoder is one of a turbo encoder and a convolutional encoder.

69. The data rate matching method of claim 58 or 68, wherein the method is used for one of radio configuration (RC)4, RC5 and RC6 of a physical channel.

70. The method of claim 1, 7, 16, 21, 25, 31, 47, or 57, wherein the data rate is a flexible data rate.

71. The method of claim 70, wherein a data rate includes a variable data rate.

72. A data rate matching method comprising:
encoding input bits having at least a flexible data rate;
puncturing or repeating coded bits to match to an interleaver size N according to a ratio of the interleaver size and a length L of the coded bits;
wherein the puncturing or the repeating is between a predetermined number of coded bits and a rest of coded bits.

73. The method of claim 72, wherein the puncturing or the repeating is variable for a predetermined number of input bits.

74. The method of claim 73, wherein the repeating is differently performed based on N mod L.

75. The method of claim 73, wherein the puncturing is differently performed based on L mod N.

76. The method of claim 72, wherein k-th bit of resultant bits of puncturing or repeating provided to the interleaver is $\lfloor kL/N \rfloor$-th coded bit.

77. The method of claim 72, wherein a data rate further includes a variable data rate.

78. The method of claim 72, wherein the predetermined number of coded bits is different from a number of the rest of coded bits.

* * * * *

UNITED STATES PATENT AND TRADEMARK OFFICE
CERTIFICATE OF CORRECTION

PATENT NO. : 6,898,743 B2
DATED : May 24, 2005
INVENTOR(S) : Young Woo Yoon et al.

It is certified that error appears in the above-identified patent and that said Letters Patent is hereby corrected as shown below:

<u>Title page,</u>
Insert Item:
-- [54]  DATA RATE MATCHING METHOD --.

Signed and Sealed this

Tenth Day of January, 2006

JON W. DUDAS
*Director of the United States Patent and Trademark Office*